Feb. 3, 1942.    A. NAGY    2,271,743
METHOD OF GRINDING HARD METALS
Filed Nov. 10, 1939

Inventor
Arpad Nagy
by
Taulmin & Taulmin
Attorneys

Patented Feb. 3, 1942

2,271,743

UNITED STATES PATENT OFFICE 2,271,743

METHOD OF GRINDING HARD METALS

Arpád Nagy, Bryanston Square, London, England

Application November 10, 1939, Serial No. 303,855
In Great Britain November 19, 1938

4 Claims. (Cl. 51—281)

The present invention relates to methods of grinding "hard metals," by which expression is to be understood the well known hard materials used commercially as moulds, dies or cutting tools which have as their basis sintered carbides of boron or of metals of the tungsten, vanadium, tantalum and titanium group, generally associated with a carrier metal, for example cobalt.

Now, such hard metal bodies have to be reshaped, polished, lapped or otherwise worked for certain purposes for which they are intended to be used, for example when they are to be used as cutting tools. Hitherto, the machining or reshaping has been effected by grinding wheels, for example of carborundum. In view of the fact that the grinding granules are of inadequate relative hardness, the carbide grains of the hard metals are not cut through but are simply torn out of the texture of the metal, and of course this represents a considerable drawback, especially in the case of cutting tools, because a bad cutting shape results.

It has previously been proposed to use for this purpose diamond grinding or lapping discs, comprising diamond particles or pulverised diamonds pressed into a carrier mass of artificial resin or the like. The grinding tools which are charged with the diamond particles are actually able to cut through the carbide grains in the hard metal in view of the fact that the diamond granules are of a greater absolute hardness, so that in this way it is possible to obtain a satisfactory cutting edge on hard metal tools or good grinding, polishing or lapping surfaces.

Furthermore, cast iron diamond discs are known and have for a considerable period been used in the grinding of diamonds, and also have been used recently for the machining of hard metals.

Generally speaking, however, none of the known methods is adapted to form absolutely precise shapes economically and without the grinding wheels and the tools being under continual control, or without the use of a copy grinding machine or negative pattern. A number of difficulties arise in the manufacture of these profiled and precision tools since the grinding wheels undergo a great deal of wear, and the manufacture of profiled diamond wheels can only be an economic possibility in most infrequent cases, in view of the heavy outlay.

The present invention removes all these disadvantages and permits a surprisingly easy and rapid grinding of hard metals.

The invention provides a method of grinding a hard metal, which consists in supporting the hard metal in proximity to a moving carrier body and employing as the grinding agent a suspension in a liquid of particles of a material having a hardness at least equal to that of the hard metal, the conditions being such that the hard particles become embedded in the carrier body as it approaches the hard metal but are shed by the carrier body after having traversed the hard metal and exercised a grinding action thereon.

The carrier body must be made of a material softer than the hard metal to be ground, such for example as cast iron, copper, lead or an artificial resin, since the opposite result to that desired would otherwise ensue, i. e. the carrier body would be ground away. This phenomenon is explained by the fact that, when the two bodies and the grinding particles come into contact, the latter are forced by the hard metal into the material of the softer carrier body and in this way the carrier body is transformed into a grinding tool, which, since the grinding particles are shed after they have acted on the hard metal, will be able to utilize a continuous supply of unused grinding particles throughout the grinding operation.

The following are examples of materials of which the grinding particles may consist: diamond, boron, carbide, tungsten carbide, silicon carbide and aluminium oxide. Oil, water and glycerine are examples of suitable liquids to act as carriers for the grinding particles.

It has previously been proposed to use for cutting precious stones, such as agates and like materials, a rotary cutter of soft steel or like material, the cutting operation being effected in a bath of abrasive liquid, such as carborundum and emery powder suspended in a light oil. It has also been suggested to grind knives by means of a flotative abradant such as emery powder, the contact between the knife and the abradant being effected by means of a rotary body of wood or other inherently non-abrasive material, the emery particles becoming temporarily embedded in the wood and being washed out again after contact with the blade.

The invention will now be explained in greater detail with reference to the accompanying drawing.

Figure 1:
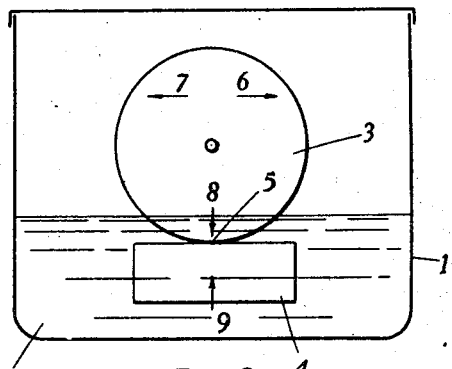
Figure 1 illustrates the application of the invention to surface grinding, and also a form of apparatus which is suitable for carrying the invention into practice.

In Figure 1, the numeral 1 represents a vessel containing the grinding agent 2 in the form of fine particles suspended in a liquid. A carrier body 3 dips into this liquid, this body in the case illustrated (i. e. in the case of surface grinding) being in the form of a disc which is maintained in continuous rotation by an electric motor, not shown. The numeral 4 denotes a hard metal blank which is suspended by means of a suitable work holder (not shown) in the bath of grinding agent. The vessel 1 is closed on all sides so as to prevent any loss of grinding liquid.

As has already been mentioned, during the rotation of the carrier body 3 the latter continuously picks up a fresh supply of particles of grinding agent from the liquid and these particles are brought into contact with the blank at the point of contact 5, where they exert their grinding action. Rotation of the carrier body sets up currents in the liquid and consequently the grinding particles are permanently agitated. As a result, the particles are picked up in a regular fashion by the carrier body and uniform grinding is achieved.

As in the case of the usual surface grinding discs, the carrier body 3 is so mounted as to be movable in the direction of the arrow 6 or of the arrow 7 and simultaneously displaced in the axial direction as well, thus grinding the upper surface of the blank. The same result can also be obtained, of course, by applying corresponding movements to the blank itself, e. g. by mounting it on a compound slide rest which can be adjusted to move the blank in the desired direction with respect to the carrier body. The depth of cut can be controlled by moving the carrier body or the blank itself in the direction of the arrow 8 or of the arrow 9 respectively.

Figure 2:
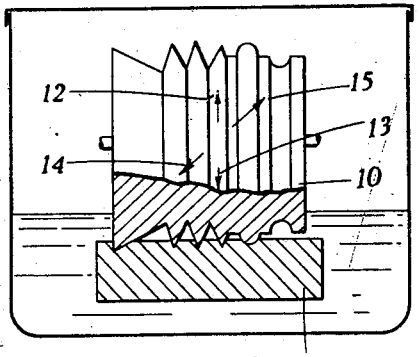
Figure 2 illustrates the application of the invention to the grinding of profiled discs.

Figure 2 illustrates the use of the invention as applied to profiled discs. The general arrangement is similar to that of Figure 1, with however the difference in the case of Figure 2 that instead of using a cylindrical rotating carrier body a profiled disc 10 is employed, this disc having the master shape accurately ground therein.

In this instance also, the requisite cutting depth and also the desired dimensions of the individual profiled shapes, can be obtained either by displacement of the disc 10 in the direction of the arrows 12 and 15 or by movement of the hard metal blank 11 in the direction of the arrows 13 and 14. Since the carrier body, as stated above, is made of a material which is softer than the grinding particles and of the blank to be operated on, there is no difficulty in manufacturing the profiled disc on a lathe or the like.

Figure 3:
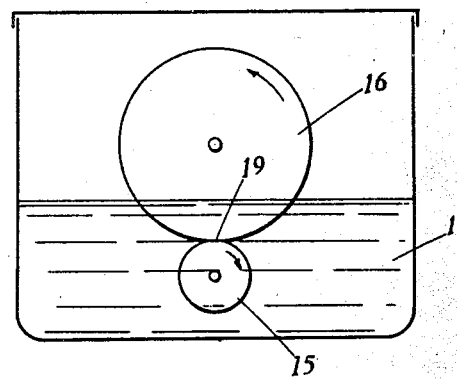
Figure 3 illustrates the application of the invention to circular grinding.

Figure 3 illustrates the use of the invention in the case of circular grinding.

In this instance also, the carrier body 16 dips into the liquid 17 containing the grinding particles and rotates about its axis. Contact is made between the body 16 and the hard metal blank 18 at the point 19. The two bodies rotate in the directions indicated by the respective arrows.

If desired, the carrier body may be profiled at its periphery. Furthermore, by displacing the carrier body in the axial direction, threading, inclined grooves and so on can be ground into the workpiece.

In all these cases the grinding action can be controlled in accordance with the choice of carrier body and the fineness of the grinding medium. Moreover, by proper choice of the grinding particles, the specific gravity or density of the carrier liquid, the rate of advance, and peripheral speed, fine grinding, lap grinding or polishing to any desired degree of accuracy can be obtained.

Figure 4:
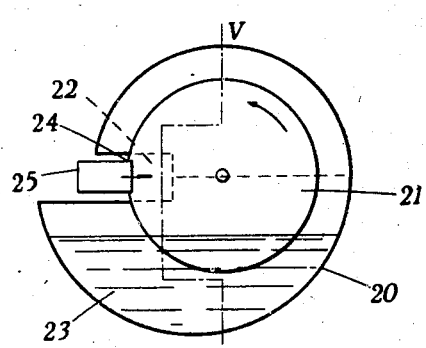
Figure 4 illustrates the use of the invention for cutting purposes.
Figure 5:
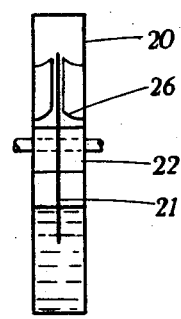
Figure 5 is a section on line V—V of the apparatus illustrated in Figure 4.

Figures 4 and 5 illustrate the invention applied to cutting or dividing a piece of hard metal. An apparatus similar to those of the foregoing embodiments could be used for this purpose, but advantageously I make certain modifications in the apparatus in this instance.

The casing 20 within which the carrier body 21 revolves is provided with a suitable cut-away portion 22. Liquid 23 containing the grinding particles is located in the lower portion of the casing and is carried around with the disc or wheel 21 when the latter is rotated in the direction of the arrow. Simultaneously, however, the liquid is thrown by centrifugal force against the inner side walls of the casing 20 but flows back on to the carrier body near the part 24 and makes contact with the blank simultaneously with this part. This result can be enhanced by the provision of suitably arranged grooves 26 (see Figure 5).

Liquid flowing away laterally at the part 24 returns into the vessel 20. The desired depth of cut can be obtained by advancing the blank in the direction of the arrow thereon, or by a movement in the opposite direction of the carrier body 21.

Figure 6:
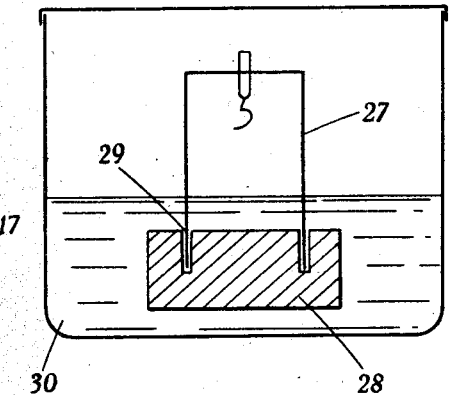
Figure 6 illustrates the invention as applied to the cutting out of discs.

A further embodiment of the invention, applicable to the cutting out of discs, is illustrated in Figure 6. The carrier body in this case is in the form of a hollow tube 27 which rotates about its own axis. At the commencement of the operation the carrier body contacts with the hard metal blank 28 at a part 29 beneath the surface of the liquid 30.

The results already referred to are obtained and the grinding particles in the liquid 30 begin to act on the blank at the part 29. By lowering the carrier body in the axial direction it is possible to cut a circular disc or plate from the blank.

Figure 7:
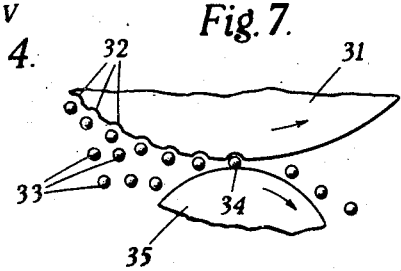
Figure 7 is a diagram which will be used to explain the basic principle of the invention.

Figure 7 is a diagrammatic showing of the phenomena which take place during the grinding operation. This figure is a cross-section through the carrier body 31 and the hard metal blank 35. Minute cavities 32 are formed in the periphery of the body 31 by the grinding particles 33 picked up by it from the liquid with which the body 31 is wetted, and these particles contact with the blank 35 at the point 34 and are afterwards shed by the carrier body.

Where desired, and especially in the case of thin carrier bodies such as 21 and 27, the carrier body may have radial or equivalent slits formed in its periphery so as to facilitate the picking up and shedding of the grinding particles by the carrier body.

Although in each of the cases illustrated, the hard metal blank is immersed in a bath of liquid grinding agent, into which the carrier body dips, other expedients may be adopted for supplying the grinding liquid to the co-operating surfaces of the blank and carrier body. Thus the grinding liquid can be applied as a spray or fed under pressure to that portion of the blank on which the carrier body is to operate.

What I claim is:

1. A method of grinding and shaping a piece of hard metal which consists in supporting the hard metal in close proximity to a moving carrier body made of metal softer than the hard metal and submerging the portion of said hard metal to be ground and at least a portion of said moving carrier body in a liquid containing in suspension particles of a material harder than the said hard metal, and carrying said particles of harder material on the periphery of said moving carrier and between the said periphery and the said hard metal by frictional contact between the said moving carrier body and the surface of the hard metal, and causing the particles of material to become temporarily embedded in the said carrier body as they are drawn between the said carrier body and the hard metal, and to be shed by the said carrier body after having exercised a grinding action on the hard metal.

2. A method of grinding and shaping a blank of hard metal which consists in supporting the blank in close proximity to a moving carrier body made of a softer metal than said blank, and submerging the portion of said blank to be ground and at least a portion of said moving carrier body in a liquid containing in suspension particles of a material harder than the said blank, and carrying said particles of harder material on the periphery of said moving carrier and between the said periphery and the said blank by frictional contact between the said moving carrier body and the surface of the blank, and causing the particles of material to become temporarily embedded in the said carrier body as they are drawn between the said carrier body and the blank, and to be shed by the said carrier body after having exercised a grinding action on the blank.

3. A method of grinding a hard metal blank so as to change the shape of said blank which consists in supporting the metal blank in a container and submerged in a liquid in said container, the liquid containing in suspension particles of diamond, and rotating a moving carrier body having a metal surface of a metal of the class including copper, cast iron and lead in close proximity to the said hard metal blank and carrying the said particles of diamond on the periphery of the rotating carrier body and into contact between the periphery of the rotating carrier body and the hard metal blank to cause the particles to become temporarily embedded in the said carrier body as they are drawn between the said carrier body and the hard metal blank and to be shed by the carrier body after exercising a grinding action on the hard metal blank.

4. A method of grinding a hard metal object which consists in supporting and rotating said object at least partially submerged in a liquid carrying suspended abrasive material harder than said object against a carrier body made of metal of the class including cast iron, copper and lead and carrying the abrasive material between the surfaces of said object and said carrier and causing the particles to become temporarily embedded in the carrier as they are drawn between the carrier body and said object and causing said particles to be shed from said carrier body after having exercised a grinding action on said object.

ARPÁD NAGY.